Dec. 27, 1927.
H. H. KISTNER
1,654,174
WORK HOLDER
Filed Nov. 18, 1924
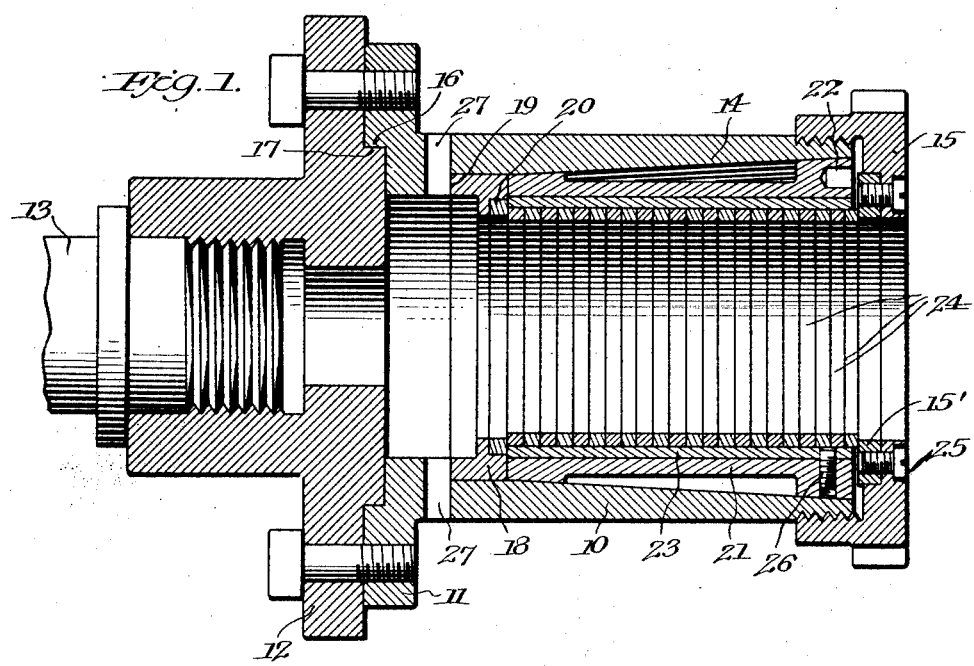
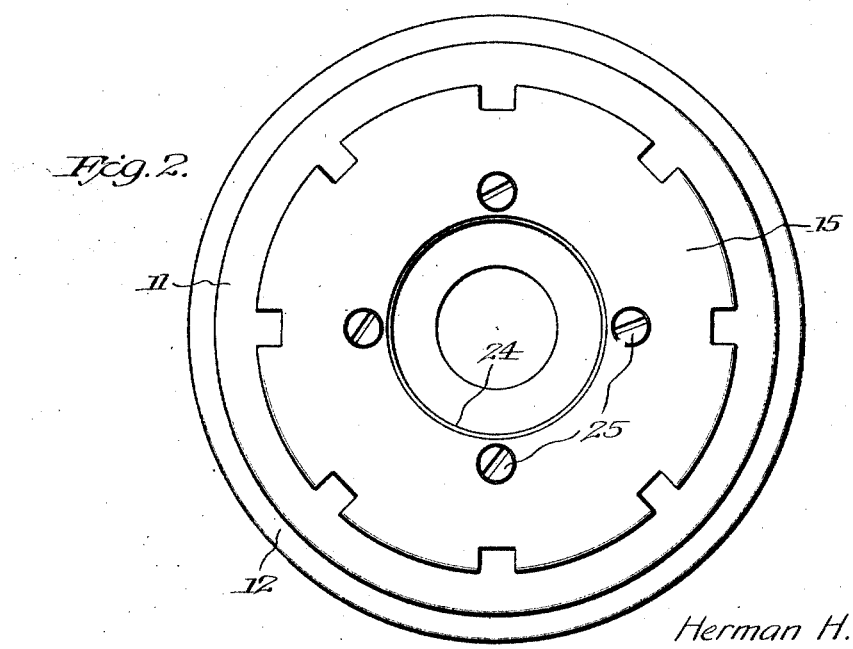
Inventor
Herman H. Kistner,
By Emery, Booth, Janney & Varney
his Attorneys Patented Dec. 27, 1927.

1,654,174

UNITED STATES PATENT OFFICE.

HERMAN H. KISTNER, OF ELIZABETH, NEW JERSEY.

WORK HOLDER.

Application filed November 18, 1924. Serial No. 750,653.

This invention relates to work holders for holding a plurality of annular pieces such as piston rings during the finishing of the inner face thereof, and aims generally to improve such devices.

In the accompanying drawings, wherein I have selected for illustrative purposes one embodiment of my invention, Fig. 1 is a central longitudinal sectional view of my work holders showing a plurality of piston rings assembled therein;

Fig. 2 is an end elevation thereof.

In the embodiment of my invention shown in the drawings a support or casing 10 is formed with suitable attaching means such as a flange 11, which is suitably bolted or otherwise secured to a face plate 12 mounted for rotation upon the spindle 13 of a lathe or other turning machine. The support or casing 10 is hollow and the wall 14 are gradually tapered on the inside toward the outer end. The outer face of the side wall is threaded at the end away from the flange 11, to secure a cap 15. The end of the support 10 abutting the face plate is preferably counterbored as at 16 to receive a shouldered portion 17 on the face plate, thereby to locate the support centrally with respect to the axis of the spindle 13. The support 10 is provided with a clamping ring 18 on the inside thereof and near the end abutting the face plate, and this ring may be formed integrally with the support or separately therefrom. When made separately from the support as shown in the drawings, the ring 18 abuts against an inner shouldered portion 19 at the inner end of the support although the ring may be securely locked therein by any other suitable means. Replaceable liners 20 may be provided for the ring 19, the inner diameter of which is slightly less than that of the piston ring to be finished.

A sleeve or gauge 21 is removably positioned in the support 10, and the outer wall is tapered correspondingly to the tapered wall 14 of the casing, so that the sleeve 21 will be held tightly and centrally in the casing 10 by the frictional contact of the walls thereof. The outer end of the sleeve may be formed with sockets 22 to receive a spanner wrench or other tool to turn the sleeve in the support to effect removal thereof. Replaceable liners 23 are fitted within the sleeve 21 to accommodate piston rings 24 of varying diameters and this sleeve may be locked therein by any suitable means 26. The internal diameter of the liners 23 is slightly greater than external diameter of the piston rings to be finished.

The clamping nut 15, threaded upon the threaded end portion of the support 10, preferably carries replaceable liners 15', the inner diameter of which is slightly larger than the external diameter of the rings to be finished, and which are held in place by screws 25.

The support or casing 10 is preferably provided with a plurality of openings 27 between the face plate 12 and the clamping ring 18 for the discharge of metal chips and shavings produced by the cutting tool.

In the manufacture of piston rings, the rings are individually produced, as by casting or cutting from a pattern, and a section is then cut from one side to form the gap of desired length. The rings are then contracted and clamped by side pressure in a mandrel for outside turning as is well understood in the art.

In transferring the rings from the mandrel to the holder for retaining the rings during the finishing of the inner face, it is important that the rings are not allowed to expand to their normal shape as each expansion and contraction of the ring during its semi-finished shape re-distributes the strains and stresses of the metal and makes for distortion of the metal, which is undesirable.

According to the present invention the sleeve 21 is placed over rings clamped on the mandrel, and when the side pressure is relieved the rings are permitted to expand slightly into contact with the inner face of the sleeve. The sleeve and assembled rings therein are then placed in the support 10 and the nut 15 is tightened. The rings are thus clamped by side pressure between the liners 20 and 15' ready for the finishing of the inner face thereof.

Obviously the support may be rotated or held stationary during the finishing operation according to the nature of the finishing tool. Chips and shavings will be discharged from the casing through the openings 27, thereby preventing metal particles from becoming deposited on the tapered wall 14 of the casing.

By the use of my holder the transfer of the rings from the mandrel may be accomplished as one operation, which has advantages in economy of time and lessened liability of breakage or injury due to repeated handling of the rings.

My invention is not to be restricted to the details of construction shown and described but what I claim as new is—

1. Means for assembling and holding piston rings in contracted position to be machined on the inner faces thereof, comprising a hollow support, an open ended member having a cylindrical bore adapted to receive the rings and to be fitted and centered within the support, and relatively adjustable means on the support adapted to engage and clamp said rings within said open ended member by pressure exerted from opposed sides of said rings.

2. Means for assembling and holding piston rings in contracted position to be machined on the inner faces thereof, comprising a hollow support, an open ended member having a cylindrical bore adapted to receive the rings and to be fitted and centered within the support, and relatively adjustable means on the support adapted to engage and clamp said rings within and independently of said open ended member by pressure exerted from opposed sides of said rings.

3. Means for assembling and holding piston rings in contracted position to be machined on the inner faces thereof, comprising a hollow support, an open ended member having a cylindrical bore adapted to receive the rings and to be fitted and centered within the support, said support and open ended member having oppositely tapered coacting surfaces for centralizing said member in said support, and relatively adjustable means on the support adapted to engage and clamp said rings within said open ended member by pressure exerted from opposed sides of said rings.

4. A holder for work of the character described, comprising a casing having a bore, a removable sleeve within said bore adapted to have the work assembled therein, means in said casing for limiting the inward movement of said sleeve and work, and means adjustable on said casing for clamping said work against said limiting means, said adjustable means, sleeve and limiting means having replaceable liners adapted to receive and hold work of varying diameters.

5. A work holder for supporting piston rings and the like with their inner faces unobstructed and ready for finishing, comprising a casing, a sleeve mounted within said casing, means for clamping the rings in said sleeve and casing by side pressure, the inner end of the casing being formed as a pocket for receiving chips and shavings, and passage means communicating with said pocket for discharging the chips and shavings from said pocket.

6. A work holder for supporting piston rings with their inner faces unobstructed and ready for finishing, comprising a face plate, a casing secured to said face plate and having a tapered bore, a tapered sleeve adapted to hold the work and fitted in said bore, a stop member in said casing for limiting the inward movement of the sleeve and rings, and a clamping member threaded upon the outer end of the casing having a shouldered portion for engagement with the rings held in the sleeve and adapted to hold the rings in contracted position against the stop member by side pressure.

7. A work holder for supporting piston rings with their inner faces unobstructed and ready for finishing, comprising a face plate, a casing secured to said face plate and having a tapered bore, a tapered sleeve adapted to hold the work and fitted in said bore, a stop member in said casing for limiting the inward movement of the sleeve and rings, a clamping member threaded upon the outer end of the casing, and replaceable liners secured to said stop member, sleeve and clamping means, adapted in thickness to secure piston rings of desired diameter within said holder.

In testimony whereof, I have signed my name to this specification.

HERMAN H. KISTNER.